United States Patent Office 3,364,253
Patented Jan. 16, 1968

3,364,253
ARGININE N-ACETYL-ASPARAGINATE AND ARGININE N-ACETYL-GLUTAMINATE
Roland-Yves Mauvernay, Riom, Puy-de-Dome, France, assignor to Laboratoire d'Analyses et de Recherches Mauvernay-Centre Europeen de Recherches Mauvernay (C.E.R.M.), Riom, Puy-de-Dome, France
No Drawing. Filed Apr. 28, 1964, Ser. No. 363,270
Claims priority, application Great Britain, May 7, 1963, 17,976/63
3 Claims. (Cl. 260—501.11)

The present invention relates to a new group of medical preparations which may be used as cerebral and cardiac glutamics and aspartics, and as detoxifiers in hyperammoniaemia. Such preparations are to be recommended in cases of hepatic and protidic deficiencies and in cases of physical and psychic hepatic debility.

The invention consists in a pharmaceutical composition comprising an arginine acyl-asparaginate or an arginine acyl-glutaminate. The acetyl derivatives have been found to be particularly effective.

The invention also consists in a method for the preparation of an arginine acyl-asparaginate or an arginine acyl-glutaminate, wherein arginine is reacted with an acyl-asparagine or an acyl-glutamine. The preparation of the acyl-asparagine or the acyl-glutamine is effected by the acylation of asparagine or glutamine according to a conventional method.

It is known that acetyl-arginine is more active than arginine itself in the treatment of ammoniaemia, but arginine acetyl-asparaginate and arginine acetyl-glutaminate have been found to be even more active against the increase in the proportion of ammonia in the blood, and therefore constitute better anti-toxic compounds. Their administration moreover simultaneously gives rise to a great increase in the proportion of cardiac and cerebral aspartic acid.

Thus the medicinal preparations of the invention allow for a more effective treatment of aspartic and arginic deficiencies than hitherto known compounds of more or less related structures.

It will be appreciated that although reference is made hereinafter to arginine acetyl-asparaginate as a specific example, the scope of the invention is not limited thereby and includes other acyl-asparaginates and acyl-glutaminates of arginine.

Method for the preparation of arginine acetyl-asparaginate, starting from asparagine and arginine, will now be given by way of example:

*Example 1.—Preparation of N-acetyl-asparagine*

0.1 mol. (13.2 g.) of asparagine are dissolved in 100 ml. of normal sodium hydroxide solution; the resulting solution is cooled to 0° C. and the following solutions are added to it simultaneously while stirring and cooling:

acetic anhydride: 0.2 mol in 150 ml. ether
2 N NaOH solution: 150 ml.

After addition of the above reagents, the resulting mixture is stirred for approximately 1 hour, after which acidification is carried out with 66.5 ml. of 6 N sulphuric acid. The solvents are evaporated off under vacuum leaving a residue. The residue is extracted with hot 80% alcohol. The N-acetyl-asparagine precipitates on the addition of ether. 13 g. of a white crystalline product is obtained, with a melting point of 164 to 165° C.

*Example 2.—Preparation of arginine N-acetyl-asparaginate*

17.4 g. of arginine are dissolved in 100 cc. of water at ambient temperature and 17.4 g. of N-acetyl-asparagine are added thereto while stirring. A clear solution is obtained. The water is removed under vacuum at a temperature above 60° C., and the product crystallises as a white hygroscopic powder which is soluble in water and insoluble in alcohol, and which has a pasty melting point of between 135 and 145° C.

Experimental tests of the efficacy of arginine acetyl-asparaginate have been conducted in the field of the treatment of hyperammoniaemia. The method used consists of measuring the action of arginine acetyl-asparaginate on a hyperammoniaemia induced in a rat by ligature of the choledoch.

The experimental method used was as follows:

A group of white Wistar rats fed on a common diet underwent ligature of the choledoch, which gave rise to ammoniaemia in the blood. The group was divided in two—a first group of rats were not treated and served as controls, while a second group were treated with arginine acetyl-asparaginate. The dosing method used was that of MacDermott and Adams, as modified by Delorme, Darnis and Fauvert.

It was found that in normal rats, i.e. with no ligature of the choledoch, the ammoniaemia rating is 15±5 gammas/100 ml., or, in other words, about the same as in man.

It was then found that in the control group of rats which had undergone ligature of the choledoch, the ammoniaemia rating evaluated over a measurement period of 7 days after the ligature was between 46 and 84 gammas, or an average of 56.5 gammas/100 ml.

It therefore appears that ligature of the choledoch in the Wistar rat necessarily gives rise to a marked increase in the ammoniaemia rating. This test therefore does constitute a method of reference enabling a pathological hyperammoniaemia to be regularly induced and enabling the influence, if any, of a medicine on this phenomenon to be studied easily.

To another batch of rats, living under the same conditions, was then administered a dose if arginine acetyl-asparaginate of 60 mg./per 100 g. body weight, intraperitoneally, two days after ligature of the choledoch, and the dose was repeated every day for five days, the animals being killed on the seventh day after ligature. The ammoniaemia ratings obtained were between 14 and 35 gammas, the average being 22.7 gammas/100 ml.

It can therefore be concluded that arginine acetyl-asparaginate does have a very effective preventive action on hyperammoniaemia induced in the Wistar rate by ligature of the choledoch.

I claim:
1. An arginine compound selected from the group consisting of arginine N-acetyl-asparaginate and arginine N-acetyl-glutaminate.
2. Arginine N-acetyl-asparaginate.
3. Arginine N-acetyl-glutaminate.

References Cited

UNITED STATES PATENTS 3,178,342   4/1965   Buzas _____ 260—501

FOREIGN PATENTS 792,576   4/1950   Great Britain.

OTHER REFERENCES

Gullino et al., Archives of Biochemistry and Biophysics 76 (1958), 430–438, QP. 501 A77.

LORRAINE A. WEINBERGER, *Primary Examiner.*

M. WEBSTER, *Assistant Examiner.*